United States Patent
Wei et al.

(10) Patent No.: US 11,009,947 B2
(45) Date of Patent: May 18, 2021

(54) SYSTEMS AND METHODS FOR SCREEN BRIGHTNESS CONTROL AND AUTO-LOCK BASED ON EYE DETECTION

(71) Applicant: Citrix Systems, Inc., Ft. Lauderdale, FL (US)

(72) Inventors: Daowen Wei, Nanjing (CN); Jian Ding, Nanjing (CN); Hengbo Wang, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 16/686,832

(22) Filed: Nov. 18, 2019

(65) Prior Publication Data

US 2021/0089122 A1 Mar. 25, 2021

Related U.S. Application Data

(63) Continuation of application No. PCT/CN2019/107485, filed on Sep. 24, 2019.

(51) Int. Cl.
*G06F 3/01* (2006.01)
*G09G 5/10* (2006.01)
(Continued)

(52) U.S. Cl.
CPC ............ *G06F 3/013* (2013.01); *G06F 21/316* (2013.01); *G06K 9/00604* (2013.01); *G06T 7/50* (2017.01);
(Continued)

(58) Field of Classification Search
CPC ...................................................... G06F 3/013
See application file for complete search history.

(56) References Cited

U.S. PATENT DOCUMENTS

| 6,002,386 A | 12/1999 | Gu | |
|---|---|---|---|
| 2003/0123027 A1* | 7/2003 | Amir | G06K 9/00604 351/209 |

(Continued)

FOREIGN PATENT DOCUMENTS

| CN | 101976109 | 2/2011 |
|---|---|---|
| CN | 102510457 | 6/2012 |

(Continued)

OTHER PUBLICATIONS

International Search Report received for PCT Application No. PCT/CN2019/107485. dated Jun. 30, 2020. 5 Pages.

(Continued)

*Primary Examiner* — Phi Hoang
(74) *Attorney, Agent, or Firm* — Finch & Maloney PLLC

(57) ABSTRACT

A computer system is provided. The computer system includes a memory and at least one processor coupled to the memory and configured to detect open eyes in an image received from a camera of the computer; recognize properties of the open eyes including orientation, designation as a left or right eye, and relative position of the eyes; group the detected open eyes into pairs of eyes based on the recognized properties; measure pupillary distance (e.g. represented in image pixels) of each of the pairs of eyes; identify the pair of eyes associated with the largest pupillary distance as the eyes closest to the camera; calculate a relative distance from the camera to the closest pair of eyes, the relative distance calculated as a ratio of the camera focal length to the largest pupillary distance; and reduce brightness of the computer screen if the relative distance is less than a threshold ratio.

20 Claims, 12 Drawing Sheets

(51) Int. Cl.
*G06T 7/70* (2017.01)
*G06K 9/00* (2006.01)
*G06F 21/31* (2013.01)
*G06T 7/50* (2017.01)

(52) U.S. Cl.
CPC ............ *G06T 7/70* (2017.01); *G09G 5/10* (2013.01); *G06T 2207/30201* (2013.01); *G06T 2207/30242* (2013.01); *G09G 2354/00* (2013.01); *G09G 2358/00* (2013.01)

(56) References Cited

U.S. PATENT DOCUMENTS

| | | | | |
|---|---|---|---|---|
| 2011/0316881 | A1* | 12/2011 | Yoshifuji | H04N 13/31 345/634 |
| 2013/0293456 | A1* | 11/2013 | Son | G06F 3/013 345/156 |
| 2014/0208145 | A1* | 7/2014 | Piccolotto | G09G 3/20 713/324 |
| 2014/0347454 | A1* | 11/2014 | Qin | G02B 30/27 348/54 |
| 2015/0124083 | A1* | 5/2015 | Attar | G06T 7/30 348/135 |
| 2016/0373645 | A1* | 12/2016 | Lin | G02B 27/0093 |
| 2018/0286065 | A1* | 10/2018 | Knorr | G06T 7/277 |

FOREIGN PATENT DOCUMENTS

| | | |
|---|---|---|
| CN | 103793719 | 5/2014 |
| CN | 104866082 | 8/2015 |
| CN | 105205438 | 12/2015 |
| CN | 105550554 | 5/2016 |
| CN | 105701380 | 6/2016 |
| CN | 105759971 | 7/2016 |
| CN | 106156663 | 11/2016 |
| CN | 106297733 | 1/2017 |
| CN | 107077212 | 8/2017 |
| CN | 107783643 | 3/2018 |
| CN | 109656371 | 4/2019 |

OTHER PUBLICATIONS

Written Opinion of the International Searching Authority received for PCT Application No. PCT/CN2019/107485. dated Jun. 30, 2020. 4 Pages.

"8 hidden features every Samsung Galaxy phone user should know", retrieved from the Internet: https://mashable.com/2015/03/31/8-hidden-features-samsung-galaxy-phones/ [copy retrieved Dec. 21, 2020] 12 pages.

* cited by examiner

Screen Brightness Control/Auto-lock System
100

SYSTEMS AND METHODS FOR SCREEN BRIGHTNESS CONTROL AND AUTO-LOCK BASED ON EYE DETECTION

RELATED APPLICATIONS

This application claims the benefit under 35 U.S.C. § 120 as a continuation of PCT application No. PCT/CN2019/107485 titled SYSTEMS AND METHODS FOR SCREEN BRIGHTNESS CONTROL AND AUTO-LOCK BASED ON EYE DETECTION, filed on Sep. 24, 2019, which designates the United States. The content of the aforementioned application is hereby incorporated herein by reference in its entirety.

BACKGROUND

Many computing platforms, including mobile devices, provide for automatic brightness control of the display screen. This function, however, is typically controlled in a simple manner, for example by a light sensor which measures ambient light, but does not address many other factors which may be useful for determining an appropriate brightness of the screen. Automatic locking capability is another common feature provided on many devices. Here again though, this feature is typically implemented in a simple manner, based on a timer which measures a period of inactivity before locking the device, and fails to address other factors that may be useful for triggering the device lock.

SUMMARY

In at least one example, a computer system is provided. The computer system includes a memory; and at least one processor coupled to the memory and configured to: detect one or more open eyes in an image received from a camera of the computer system; recognize properties of the detected open eyes, the properties including one or more of orientation, designation as a left eye or a right eye, and relative position of the eyes; group the detected open eyes into one or more pairs of eyes based on the recognized properties; measure pupillary distance in the image of each of the pairs of eyes; identify one of the pairs of eyes associated with a largest of the pupillary distances as a pair of eyes closest to the camera; calculate a relative distance from the camera to the pair of eyes closest to the camera, the relative distance calculated as a ratio of a focal length of the camera to the largest of the pupillary distances; and reduce brightness of the screen of the computer system if the relative distance is less than a threshold ratio.

At least some examples of the computer system can include one or more of the following features. The at least one processor can be configured to determine a count of the detected open eyes and reduce brightness of the screen of the computer system if the count of the detected open eyes equals zero. The at least one processor can be configured to update, at periodic intervals, the relative distance from the camera to the pair of eyes closest to the camera and the count of detected open eyes. The at least one processor can be configured to lock the screen of the computer system after a selected time period has elapsed, if the updated relative distance from the camera to the pair of eyes closest to the camera remains less than the threshold ratio or if the updated count of detected open eyes remains at zero. The at least one processor can be configured to restore brightness of the screen of the computer system if the updated relative distance from the camera to the pair of eyes closest to the camera reaches the threshold ratio or if the updated count of detected open eyes exceeds zero. The at least one processor can be configured to lock the screen of the computer system if the count of the detected open eyes exceeds a threshold open eye count. In the computer system, the pupillary distance is represented in pixels of the image.

In at least one example, a method of controlling screen brightness based on eye detection is provided. The method includes detecting, by a computer system, one or more open eyes in an image received from a camera of the computer system; recognizing, by the computer system, properties of the detected open eyes, the properties including one or more of orientation, designation as a left eye or a right eye, and relative position of the eyes; grouping, by the computer system, the detected open eyes into one or more pairs of eyes based on the recognized properties; measuring, by the computer system, pupillary distance in the image of each of the pairs of eyes; identifying, by the computer system, one of the pairs of eyes associated with a largest of the pupillary distances as a pair of eyes closest to the camera; calculating, by the computer system, a relative distance from the camera to the pair of eyes closest to the camera, the relative distance calculated as a ratio of a focal length of the camera to the largest of the pupillary distances; and reducing, by the computer system, brightness of a screen of the computer system if the relative distance is less than a threshold ratio.

At least some examples of the method can include one or more of the following features. The act of determining a count of the detected open eyes and reduce brightness of the screen of the computer system if the count of the detected open eyes equals zero. The act of updating, at periodic intervals, the relative distance from the camera to the pair of eyes closest to the camera and the count of detected open eyes. The act of locking the screen of the computer system after a selected time period has elapsed, if the updated relative distance from the camera to the pair of eyes closest to the camera remains less than the threshold ratio or if the updated count of detected open eyes remains at zero. The act of restoring brightness of the screen of the computer system if the updated relative distance from the camera to the pair of eyes closest to the camera reaches the threshold ratio or if the updated count of detected open eyes exceeds zero. The act of locking the screen of the computer system if the count of the detected open eyes exceeds a threshold open eye count. The pupillary distance is represented in pixels of the image.

In at least one example, a non-transitory computer readable medium storing executable sequences of instructions to control screen brightness based on eye detection is provided. The sequences of instructions include instructions to: detect one or more open eyes in an image received from a camera of the computer system; recognize properties of the detected open eyes, the properties including one or more of orientation, designation as a left eye or a right eye, and relative position of the eyes; group the detected open eyes into one or more pairs of eyes based on the recognized properties; measure pupillary distance in the image of each of the pairs of eyes, the pupillary distance represented in pixels of the image; identify one of the pairs of eyes associated with a largest of the pupillary distances as a pair of eyes closest to the camera; calculate a relative distance from the camera to the pair of eyes closest to the camera, the relative distance calculated as a ratio of a focal length of the camera to the largest of the pupillary distances; and reduce brightness of a screen of the computer system if the relative distance is less than a threshold ratio.

At least some examples of the non-transitory computer readable medium can include one or more of the following features. Instructions to determine a count of the detected open eyes and reduce brightness of the screen of the computer system if the count of the detected open eyes equals zero. Instructions to update, at periodic intervals, the relative distance from the camera to the pair of eyes closest to the camera and the count of detected open eyes. Instructions to lock the screen of the computer system after a selected time period has elapsed, if the updated relative distance from the camera to the pair of eyes closest to the camera remains less than the threshold ratio or if the updated count of detected open eyes remains at zero. Instructions to restore brightness of the screen of the computer system if the updated relative distance from the camera to the pair of eyes closest to the camera reaches the threshold ratio or if the updated count of detected open eyes exceeds zero. Instructions further include instructions to lock the screen of the computer system if the count of the detected open eyes exceeds a threshold open eye count.

Still other aspects, examples, and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
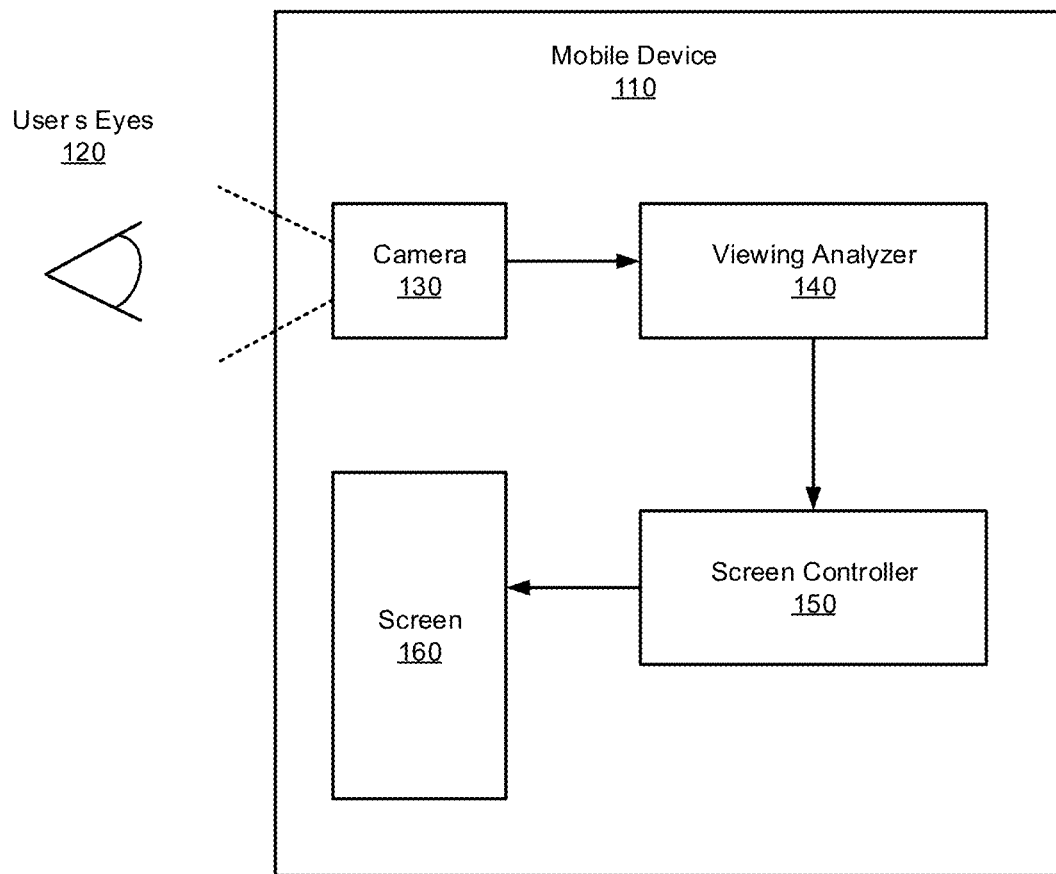
FIG. 1 is a block diagram of a screen brightness control and auto-lock system in accordance with an example of the present disclosure.

As noted previously, many computing platforms, including mobile devices, provide for automatic brightness control of the display screen based on ambient light conditions and/or automatic locking capability based on a usage/inactivity timer. Existing techniques, however, fail to address other problems such as providing eyesight protection for users that view the screen from a too close distance, or mitigating the security threat posed by additional sets of eyes viewing the screen. For example, as the use of digital devices continues to increase, the risk of eyestrain, fatigue, and the potential for resulting nearsightedness becomes more significant. Additionally, security issues are of increasing concern in this digital age, and confidential information can be easily compromised if viewers, other than the intended user of the device, are able to see information displayed on the screen. Power reduction is also an issue, and more effective/efficient techniques for screen control can improve battery life.

To address these problems, and as summarized above, various examples described herein are directed to systems and methods for screen brightness control and auto-locking of a computer platform or mobile device. The disclosed techniques are based on detection of eyes viewing the screen, recognition of properties of those eyes, pairing of those eyes, and estimation of the distance of those eye pairings from the screen relative to the pupillary distance (i.e., the distance between the pupils of the eyes of the viewer). It is generally accepted that viewing a screen from a distance that is less than approximately four times the pupillary distance can be unsafe from a health perspective. Dimming and/or locking the screen can force users to adjust their viewing position to a more suitable position.

In some examples, detection of multiple pairs of eyes can indicate a potential security risk which can be addressed by dimming and/or locking the screen. Additionally, detection of closed eyes or no open eyes can indicate that the viewer has fallen asleep or that there is no viewer.

This situation can also pose a security risk, in addition to wasting battery power, but can also be addressed by dimming and/or locking the screen.

In some examples, the eyes are detected individually and then paired if possible (e.g., if matching pairs of eyes can be found). The disclosed techniques avoid the need for facial detection which circumvents the problems that could otherwise occur with partially occluded facial images.

As will be understood in view of this disclosure, the systems and methods for screen brightness control and auto-locking based on eye detection provided herein have several advantages over methods which require either multiple cameras, multiple images taken from different angles, or the use of depth cameras or other complex and costly 3-D imaging techniques. For instance, the systems and methods described herein enable determination of viewing distance based on a measure of relative distance ratio, using triangulation techniques, as will be described in greater detail below. These techniques operate on a single image provided by a front facing camera of the device.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Screen Brightness Control and Auto-lock System

In some examples, a screen brightness control and auto-lock system is configured to control screen brightness and provide auto-locking of a computer platform or mobile device based on detection of eyes viewing the screen and estimation of distance of those eyes from the screen, relative to pupillary distance. FIG. 1 is a block diagram of a screen brightness control and auto-lock system 100 in accordance with an example of the present disclosure. As shown in FIG. 1, the system 100 includes a camera 130, a viewing analyzer 140, a screen controller 150, and a display screen 160.

The camera 130 is configured to provide an image of the user of the device when the user is viewing the device. Thus, the camera can be located on the screen side of the device, facing the user. In some examples, the camera can provide a stream of images taken at periodic intervals, for example, on the order of seconds or less.

Viewing analyzer 140 is configured to analyze the image received from the camera to detect eyes and recognize properties of those eyes such that eyes can be paired into groups of two belonging to individual viewers, if possible, or otherwise identified as unpaired. Viewing analyzer 140 is also configured to count the number of pairs of open eyes that are viewing the screen, determine if no open eyes are viewing the screen, and estimate a relative distance between the screen and the closest pair of eyes to the screen, as will be explained in greater detail below.

Screen controller 150 is configured to adjust the brightness of the screen 160 and/or lock the device, based on information provided by the viewing analyzer 140 regarding the number of eyes viewing the screen and the distance from which the viewing is taking place, as will be explained in greater detail below.

Figure 2:
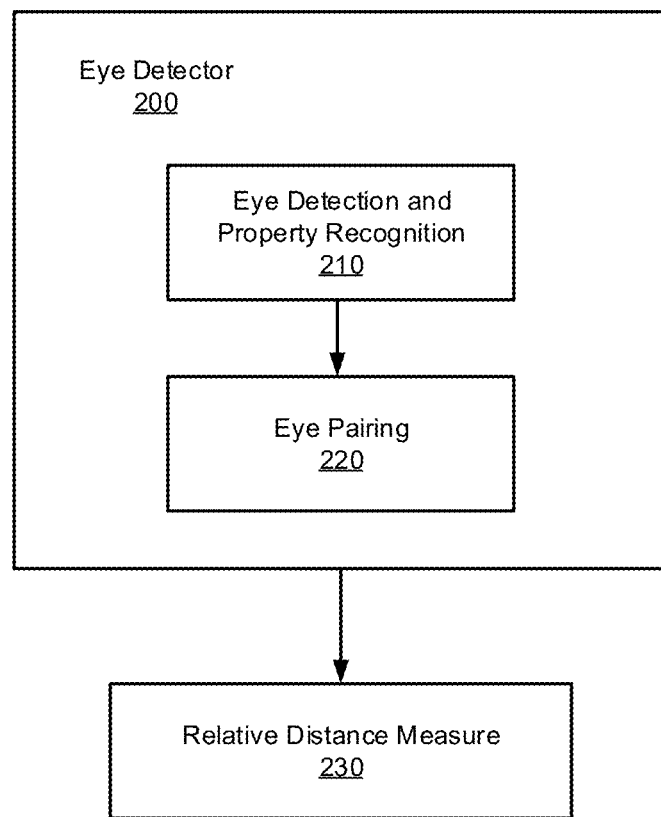
FIG. 2 is a block diagram of a viewing analyzer in accordance with an example of the present disclosure.

FIG. 2 is a block diagram of a viewing analyzer 140 in accordance with an example of the present disclosure. Viewing analyzer 140 is shown to include an eye detector 200, which further includes an eye detection and property recognition function 210 and an eye pairing function 220. Viewing analyzer 140 is shown to also include a relative distance measurement function 230.

Eye detection and property recognition function 210 is configured to detect the presence of eyes in the image and to recognize properties of those eyes. The detection may be performed using a convolutional neural network (CNN) trained to detect individual eyes without reliance on other facial features, such that eyes can be detected even if the face is partially occluded. In some examples, recognized properties of the detected eyes include orientation of the eyes, designation as a left eye or a right eye, relative position of the eyes, pointing direction (e.g., upward or downward), and whether the eye is closed or open. The detection and property recognition may be performed, for example, using a deep learning architecture (e.g., "You Only Look Once" or YOLO), a single shot detector (SSD), or other suitable techniques in light of the present disclosure.

Eye pairing function 220 is configured to pair the individually detected eyes into pairs that can be associated with a user/viewer of the screen, as will be described in greater detail below. In some images there may be multiple viewers, while in other images there may be no viewers or the viewer may have his/her eyes closed.

Relative distance measure function 230 is configured to calculate a relative distance from the camera to the pair of eyes that are closest to the camera. The relative distance is calculated as a ratio of the focal length of the camera to the largest of the pupillary distances in the image, as will be explained in greater detail below.

Figure 3:
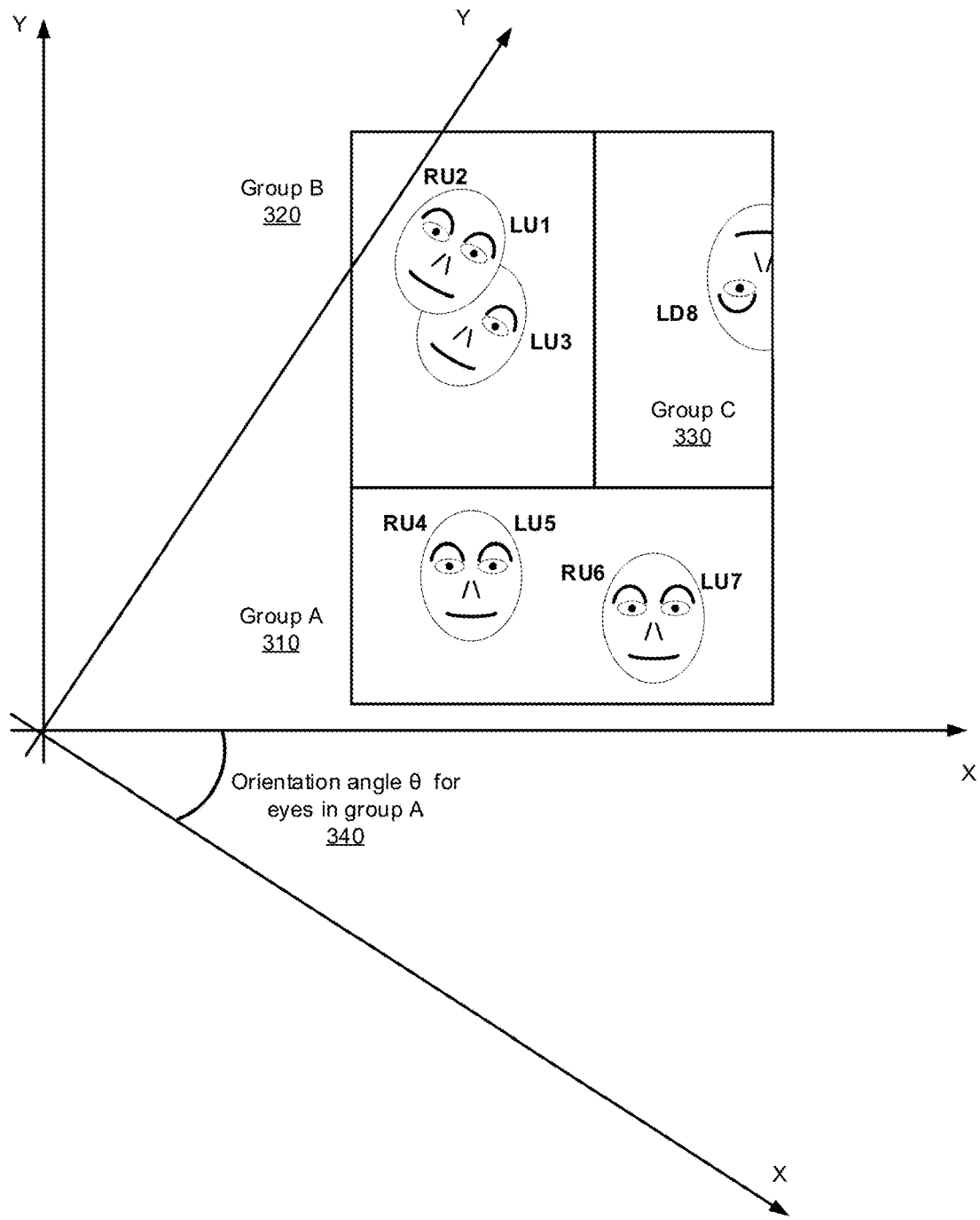
FIG. 3 illustrates groupings of eyes in multiple orientations in accordance with an example of the present disclosure.

FIG. 3 illustrates groupings 300 of eyes in multiple orientations in accordance with an example of the present disclosure. A number of images of eyes are shown in an X-Y image plane or global coordinate system defined by an x-axis and a y-axis. Eye pairing function 220 is configured to classify the eyes into three groups: group A 310, group B 320, and group C 330.

Group A includes two sets or pairs of eyes (labeled RU4, LU5, RU6, and LU7) that are at an orientation angle of zero degrees in the X-Y plane. 'R' and 'L' designate left and right eyes respectively, while 'U' designates that the eyes are directed upward (i.e., the face is in a normal or upright orientation as opposed to being upside down). These designations may be provided, for example, by function 210. The eyes labeled RU6 and LU7 are part of a face that is partially occluded.

Group B includes three eyes that are at an orientation angle θ 340 relative to the X-Y plane. In other words, the eyes in group A are oriented in the X'-Y' plane or local coordinate system which is rotated by angle θ relative to the X-Y plane, as illustrated. In some examples, function 220 may map position data between the global and local coordinate systems according to the following equations (1 and 2):

$$x' = x \times \cos\theta + y \times \sin\theta \quad (1)$$

$$y' = y \times \cos\theta - x \times \sin\theta \quad (2)$$

Two of the eyes, labeled RU2 and LU1, are paired together, by function 220, as part of one face, while the third eye L3 is a single eye since the other eye of that pair is occluded.

Group C includes a single eye labeled LD8. The other eye of that pair is occluded. The 'D' designates that the eye is directed downward (i.e., the face is upside down). In some examples, the upward and downward designations ('U' and 'D') may be considered, by function 210, as a special case or subset of the orientation angle. For example, angles in the range of zero degrees plus or minus 90 degrees would correspond to upward while angles in the range of 180 degrees plus or minus 90 degrees would correspond to downward.

In some examples, function 220 groups all detected eyes by orientation angle, after detection and recognition. The eyes in each group are considered and paired, by function 220, if they meet pairing requirements such as, for example: one right eye and one left eye, same direction in the vertical Y' axis (either upward or downward), physically plausible relative position between the two eyes, and relatively minor variations in the vertical Y' axis position.

Considering the eyes in group B, for example, function 220 could begin by starting from the right eye RU2 and filtering all left and upward pointing eyes for potential matching pairs to RU2. These would include LU1 and LU3 from the remaining eyes in group B. Both LU1 and LU3 are on the right side of RU2, so they remain candidates for pairing. Function 220 may then calculate the Y' position in the local coordinate system for LU1 and LU3, using mapping equations 1 and 2. Compared to LU3, LU1 is closer to RU2 and the variation between LU1 and RU2 is within a selected threshold. Thus, function 220 may assume that RU2 and LU1 are to be associated with the same person and thus pair (RU2, LU1) is created and added to a list of eye pairings. Function 220 repeats the process until all remaining eyes are checked. Since the relative eye distance calculation is based on pupillary distance and thus requires pairs of eyes, single eyes are placed on a single eye list for use in determining eye counts and open/closed eyes.

Figure 4:
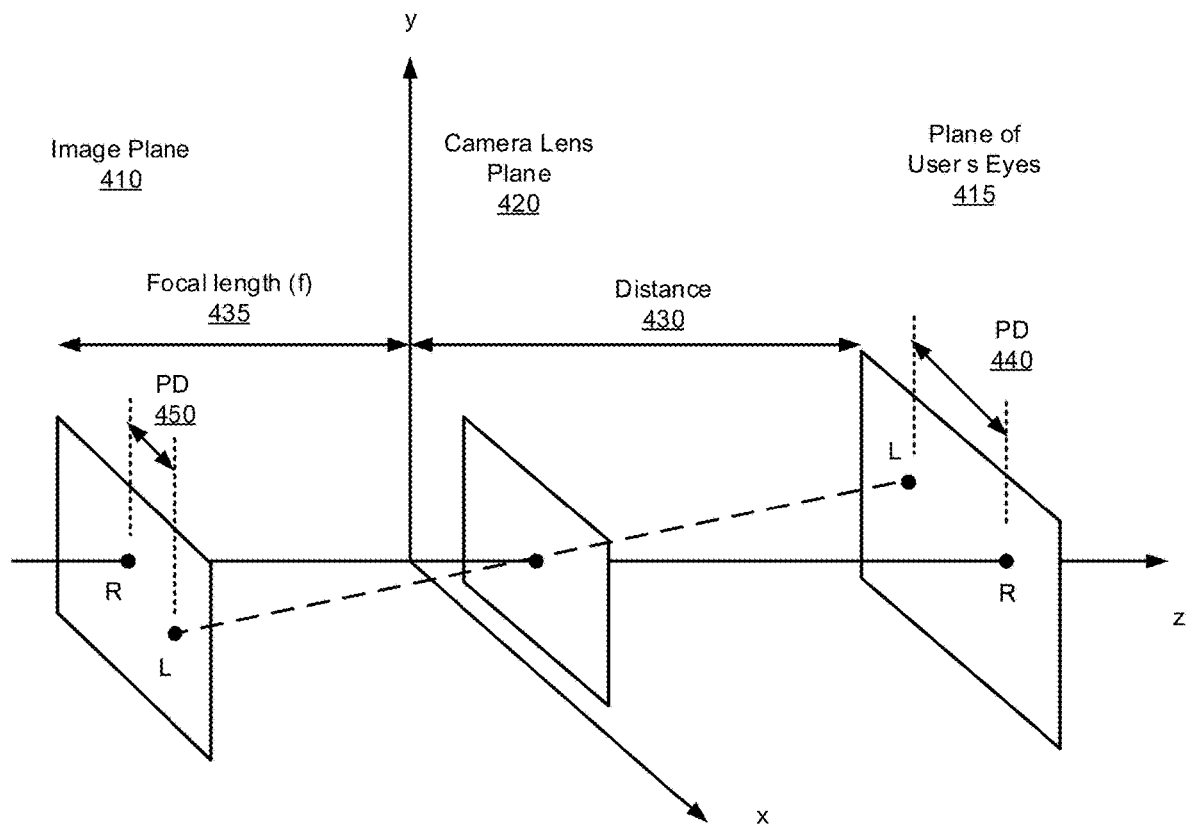
FIG. 4 illustrates the geometry of distance measurement in accordance with an example of the present disclosure.

FIG. 4 illustrates the geometry of distance measurement 400 implemented by relative distance measure function 230, in accordance with an example of the present disclosure. Three planes are shown in a 3-dimensional x, y, z coordinate system. The plane of the user's eyes 415 includes the left (L) and right (R) eyes of the user, separated by the pupillary distance (PD) 440. The PD is the physical distance between pupils measured in physical units such as, for example, inches or centimeters. The camera lens plane 420 includes the lens of the camera and is located at some distance 430 from the user. The image plane 410 includes the image sensor of the camera, upon which the lens focuses the image of the user and the user's eyes, designated R' and L'. Pupillary distance PD' 450 is the distance between R' and L' on the image sensor, and is measured in pixels of the image (e.g., on the camera image sensor). The distance from the camera lens plane 420 to the image plane 410 is the focal length $f$ 435 of the camera.

Relative distance measure function 230 may establish the following relationship (equation 3) between these distances based on the principle of triangulation:

$$\text{ratio} = \frac{\text{distance}}{PD} = \frac{f}{PD'} \quad (3)$$

where distance and PD are expressed in the same physical units, and $f$ and PD' are expressed in pixels. The focal length $f$ is generally known and PD' is determined by the eye detection and property recognition function 210. Thus, the ratio can be calculated without requiring knowledge of distance or PD. The ratio, however, represents the distance of the user/viewer from the camera relative to the pupillary distance of the user, and this is the value that screen controller 150 is configured to use for determining a safe viewing distance. In general, if a viewer is at a distance from the screen that is less than four times the pupillary distance, the viewer can expect to suffer eye strain and fatigue, and over time such viewing habits can induce nearsightedness. A safe viewing distance is therefore defined as being associated with a relative distance ratio greater than four.

Figure 5:
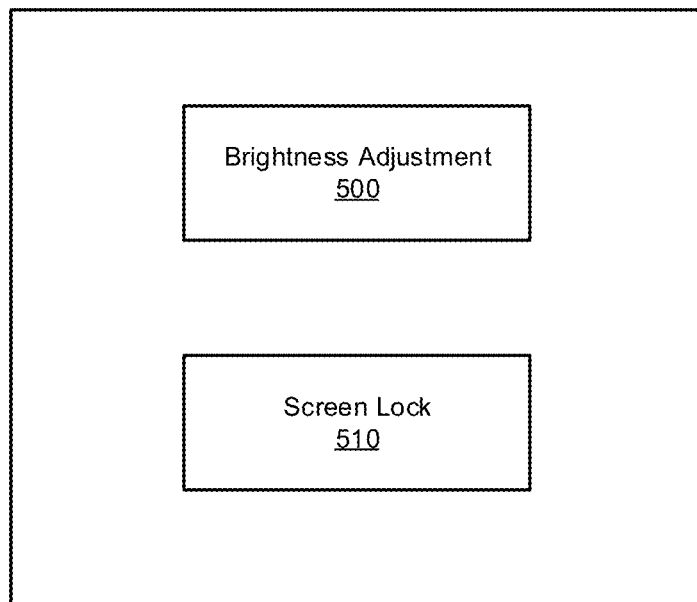
FIG. 5 is a block diagram of a screen controller in accordance with an example of the present disclosure.

FIG. 5 is a block diagram of the screen controller 150 in accordance with an example of the present disclosure. Screen controller 150 is shown to include a brightness adjustment function 500, and a screen lock function 510.

Brightness adjustment function 500 is configured to adjust the brightness of the screen 160, for example, by dimming the screen or restoring the screen to original brightness level, in response to results provided by the viewing analyzer 110. Screen lock function 510 is configured to lock the screen (and/or the device) in response to results provided by the viewing analyzer 110. The operations of these functions are summarized in the state transition diagram of FIG. 6, described below.

Figure 6:
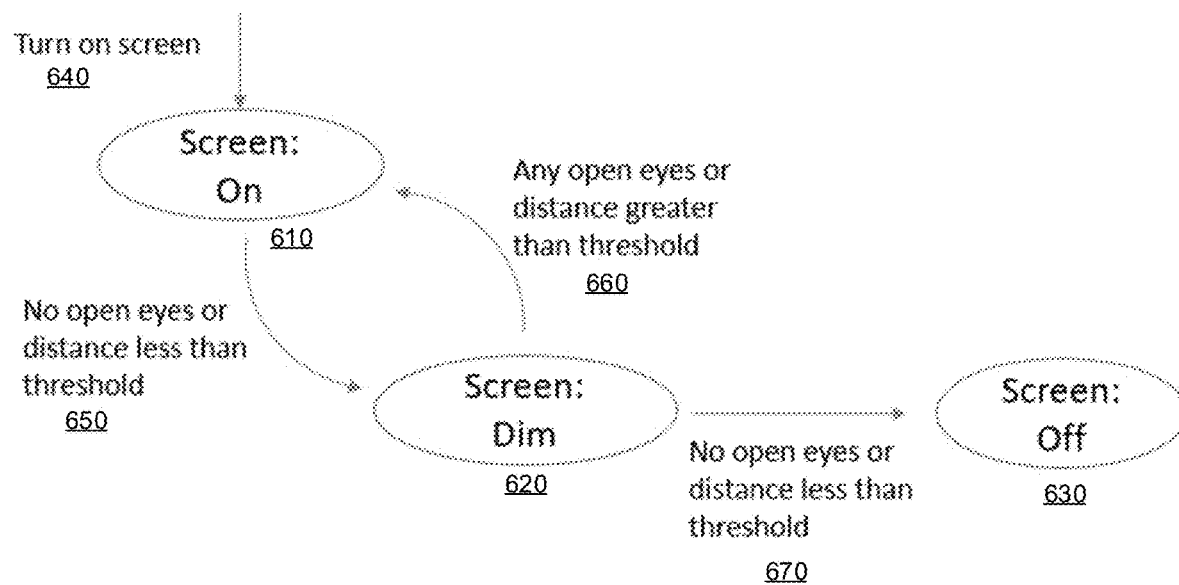
FIG. 6 illustrates a state diagram for screen control in accordance with an example of the present disclosure.

FIG. 6 illustrates a state transition diagram 600 for screen control in accordance with an example of the present disclosure. When the screen is turned on, at transition 640, the controller 150 enters the "screen on" state 610 (e.g., normal brightness). When the viewing analyzer 140 detects, at transition 650, that there are no open eyes viewing the screen or that the relative distance ratio is less than a threshold value, the screen controller 150 enters the "screen dim" state 620. At transition 660, if the viewing analyzer 140 detects any open eyes, or detects that the relative distance ratio increases above the threshold value, then the screen controller 150 returns to the "screen on" state 610. At transition 670, if the condition of no open eyes or relative distance ratio less than the threshold value persists for a selected time period, then the screen controller 150 enters the "screen off" state 630.

Screen Brightness Control and Auto-lock Process

Figure 7:
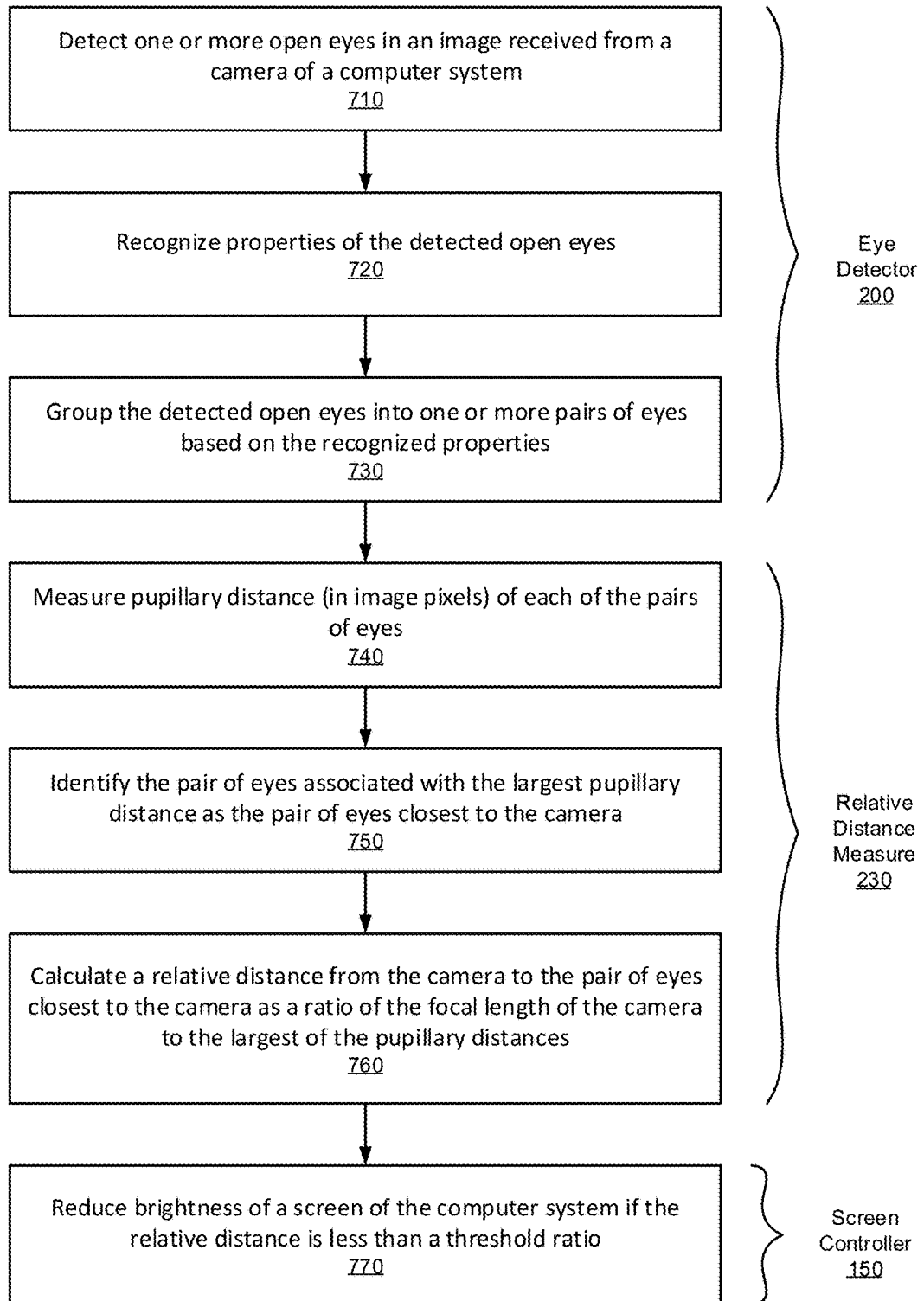
FIG. 7 is a flow diagram of a process for screen brightness control and auto-locking based on eye detection in accordance with an example of the present disclosure.

As described above, some examples of the system 100 of FIG. 1 are configured to perform a process for screen brightness control and to provide auto-locking of a computer platform or mobile device based on detection of eyes viewing the screen and estimation of the distance of those eyes from the screen relative to the pupillary distance. The processes may be executed on a processor of any suitable type (e.g., processor 1210 of FIG. 12). FIG. 7 is a flow diagram 700 of a process for screen brightness control and auto-locking based on eye detection, executed by any combination of viewing analyzer 140 and screen controller 150, in accordance with an example of the present disclosure.

The process 700 starts with detecting 710 one or more open eyes in an image received from a camera of the computer system or mobile device. The detection may be performed using a CNN trained to detect individual eyes without reliance on other facial features, as previously described.

Next, at operation 720, properties of the detected open eyes are recognized. In some examples, the properties including orientation of the eyes, designation as a left eye or a right eye, relative position of the eyes, pointing direction (e.g., upward or downward), and whether the eye is closed or open. The detection and property recognition may be performed, for example, using a deep learning architecture (e.g., YOLO), an SSD, or other suitable techniques in light of the present disclosure.

At operation 730, the detected open eyes are grouped into one or more pairs of eyes based on the recognized properties.

At operation 740, the pupillary distance of each of the pairs of eyes in the image is measured. The measured distance is represented in image pixels (e.g., the distance in pixels on the camera image sensor). At operation 750, the pairs of eyes associated with the largest of the pupillary distances in the image is identified as the pair of eyes that are closest to the camera.

At operation 760, a relative distance is calculated from the camera to the pair of eyes closest to the camera. The relative distance is calculated as a ratio of the focal length of the camera to the pupillary distance in the image of the closest pair of eyes (e.g., the largest pupillary distance). This ratio is equivalent to the ratio of the distance of the viewer from the screen in physical units (e.g., inches, centimeters, etc.) to the pupillary distance of that viewer in the same physical units.

At operation 770, the brightness of the screen of the computer system or mobile device is reduced if the relative distance ratio is less than a threshold ratio. In some examples, the threshold ratio is four, such that if the distance from the screen to the closest viewer is less than four times the pupillary distance of that viewer, the screen can be dimmed.

In some examples, a count of the detected open eyes is determined and the screen is dimmed if the count equals zero. That is to say, if there is no user currently viewing the screen, the screen can be dimmed. In some examples, the relative distance and the count of detected open eyes are updated at periodic intervals, and the display screen (or the entire device) is locked after a selected time period has elapsed, if the updated relative distance remains less than the threshold ratio or the updated count of detected open eyes remains at zero. In some examples, the update interval may be 15 seconds. However, the brightness of the screen may subsequently be restored if the updated relative distance exceeds the threshold ratio or if the updated count of detected open eyes increases from zero. Said differently, if the user resumes viewing the screen at an appropriate safe distance, then the brightness may be restored. In some examples, the update interval for screen brightness restoration may be 5 seconds.

In some examples, the display screen may be locked, if the count of the detected open eyes exceeds a threshold open eye count, to prevent viewing of the screen by too many sets of eyes, which may indicate the existence of a security issue.

Figure 8:
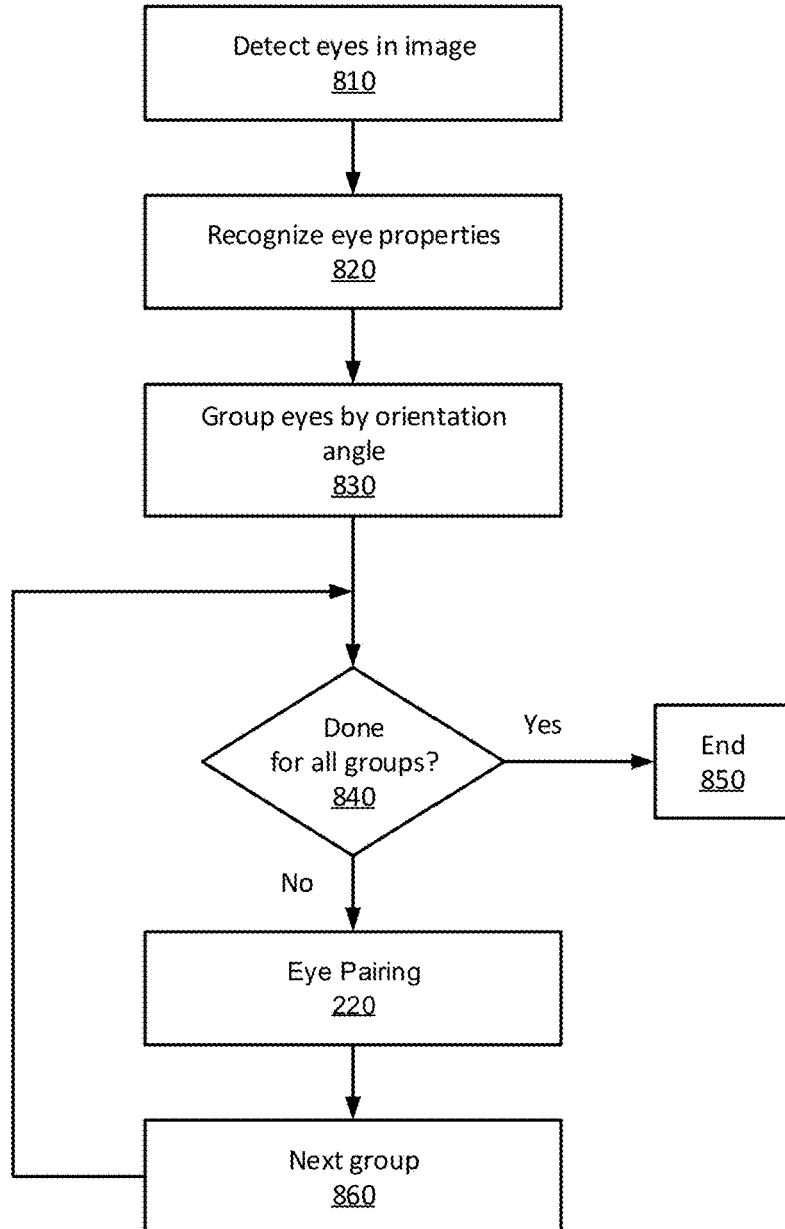
FIG. 8 is a flow diagram of a process for eye detection and property recognition in accordance with an example of the present disclosure.

FIG. 8 is a flow diagram of a process for eye detection and property recognition 210 in accordance with an example of the present disclosure. At operation 810, eyes are detected in the image provided by the camera. At operation 820, eye properties (e.g., orientation and designation as left/right, etc.) are recognized. At operation 830, the eyes are grouped by orientation angle. At operation 840, if all groups have been completed, the process ends at operation 850. At operation 220, the eyes are paired to a group, as will be explained in greater detail below in connection with FIG. 9. At operation 860, the process continues for the next group.

Figure 9:
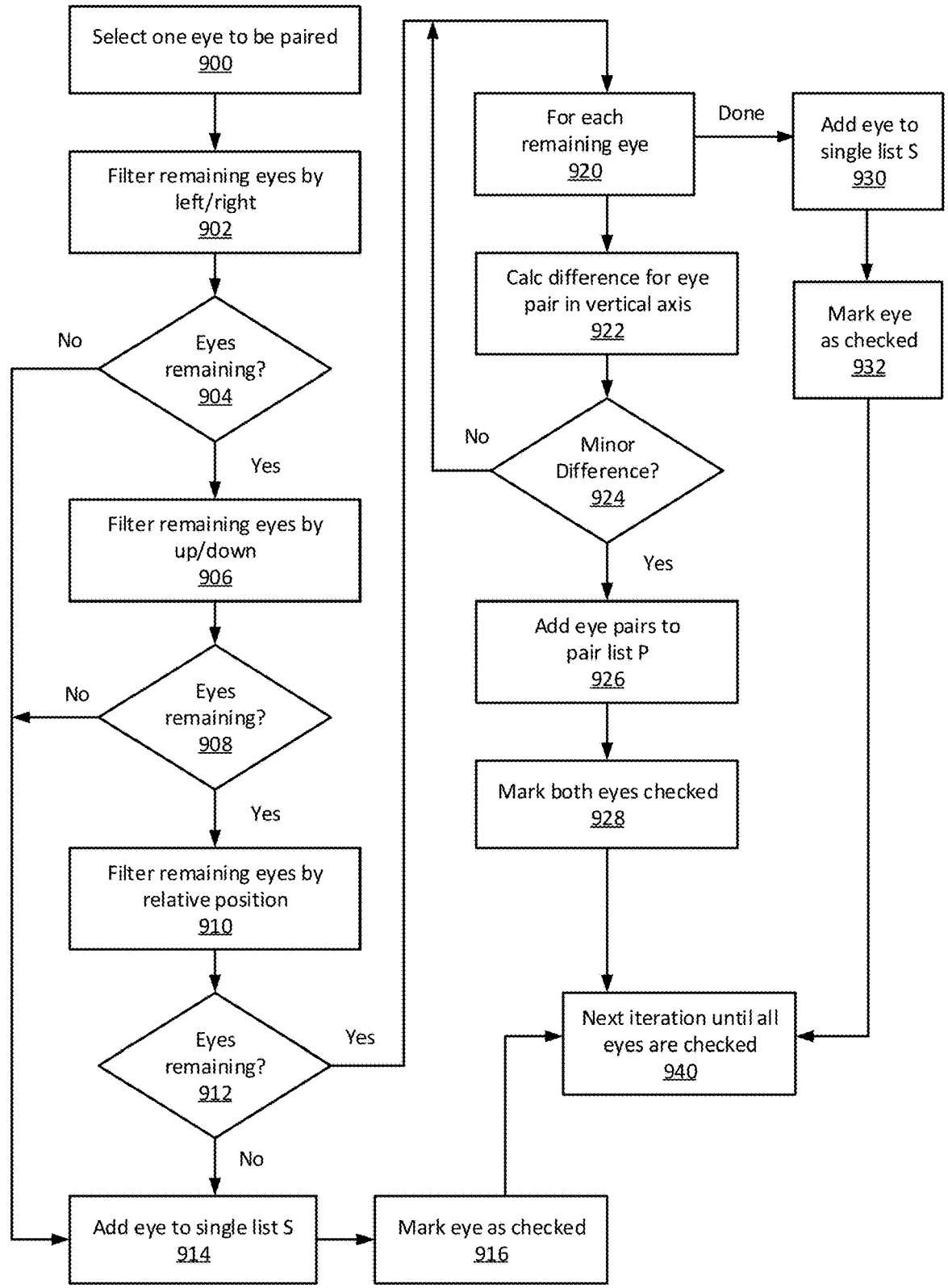
FIG. 9 is a flow diagram of a process for pairing of eyes to groups in accordance with an example of the present disclosure.

FIG. 9 is a flow diagram of an iterative process for pairing of eyes to groups 220 in accordance with an example of the present disclosure. At operation 900, one eye is selected for pairing, in the current iteration. At operation 902 the remaining eyes are filtered to match the left/right property of the current eye. At operation 904, if there are no remaining eyes, then the current eye is added to the list 'S' of single eyes, at operation 914. Otherwise, at operation 906, the remaining eyes are filtered to match the up/down pointing direction property of the current eye. At operation 908, a check is performed to determine if there are no remaining eyes, then, at operation 914, the current eye is added to the list 'S' of single eyes. Otherwise, at operation 910, the remaining eyes are filtered by plausible relative position to the current eye. At operation 912, another check is performed to determine if there are no remaining eyes, and if so, the current eye is added to the list 'S' of single eyes, at operation 914, and, at operation 916, the eye is marked as having been checked. Then, at operation 940, the next iteration is performed until all eyes have been checked.

Otherwise, continuing from operation 912, the process moves to operation 920, where each remaining eye is considered. At operation 922, the difference in the vertical axis for each eye pair is calculated. If the difference is minor (e.g., less than a selected difference threshold in the range of 10 percent to 50 percent of the height of the eye), then at operation 926, that pair of eyes is added to the pair list 'P' and, at operation 928, both eyes marked as having been checked. Then, at operation 940, the process continues with the next iteration until all eyes have been checked. Otherwise, if the difference is not minor, the process loops back to operation 920 for the next remaining eye. When all remaining eyes have been considered in this manner, then at operation 930 that eye is added to the list 'S' of single eyes, and, at operation 932, the eye is marked as having been checked. Then, at operation 940, the process continues with the next iteration until all eyes have been checked.

Figure 10:
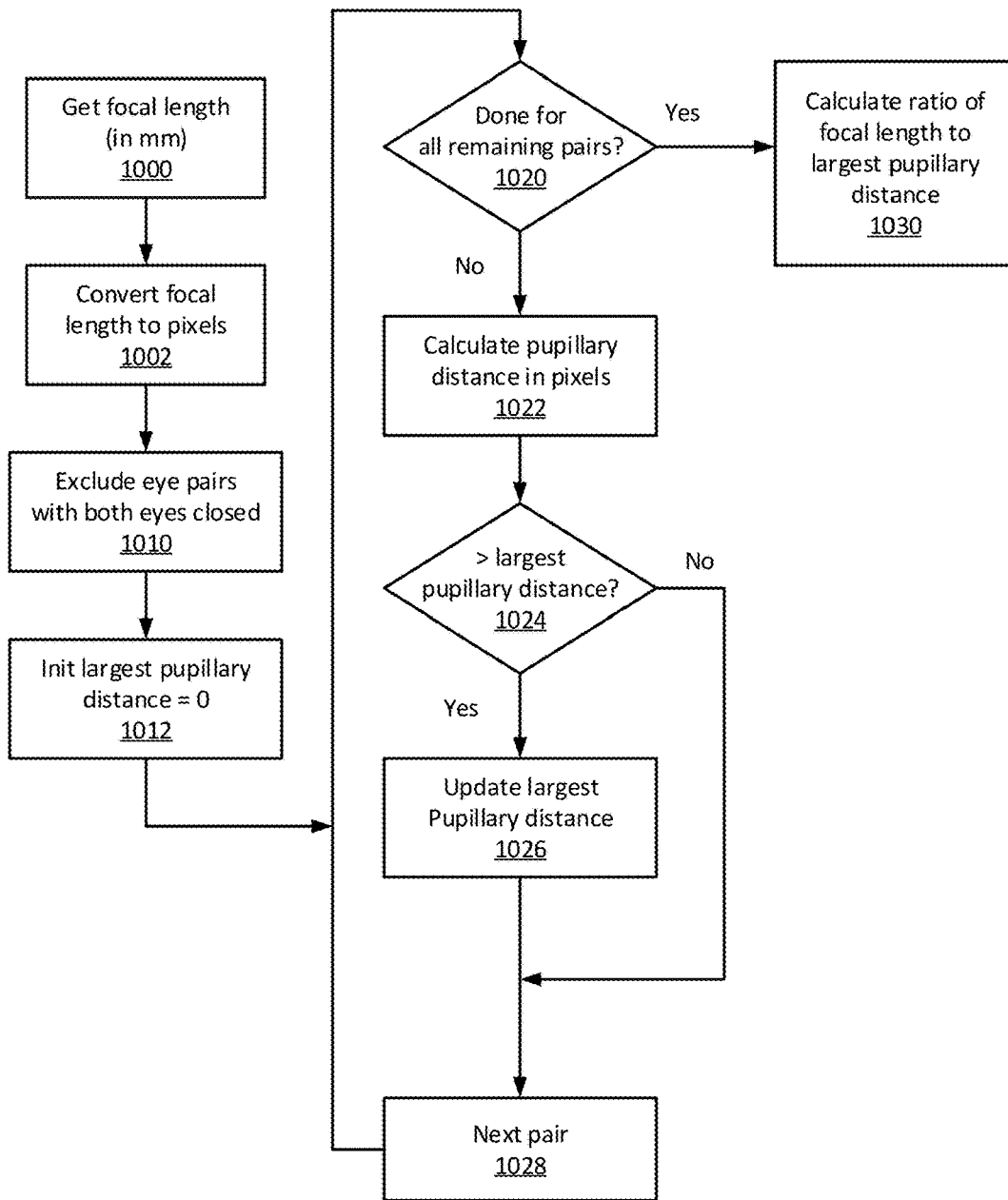
FIG. 10 is a flow diagram of a process for relative distance measurement in accordance with an example of the present disclosure.

FIG. 10 is a flow diagram of a process for relative distance measurement 230 in accordance with an example of the present disclosure. At operation 1000, the focal length $f$ of the camera (in mm) is obtained, and, at operation 1002, that focal length is converted to pixels. In some examples, that conversion may be performed according to the following equation (3):

$$f(\text{pixels}) = f(\text{mm}) * \text{sensor pixels/mm} \tag{3}$$

For example, if the image sensor is 10 mm×10 mm and provides a resolution of 1 million pixels (e.g., 1000×1000 pixels), then the sensor pixels/mm will be 1000 pixels/10 mm or 100 pixels/mm. At operation 1010, eye pairs in which both eyes are closed are excluded from further consideration for distance measurement. At operation 1012, the largest pupillary distance is initialized to zero.

Operations 1020 through 1028 are looped for each eye pair until all pairs have been processed. At operation 1022, the pupillary distance (in pixels) between eyes for the current eye pair is calculated. At operation 1024, if that distance is greater than the current largest pupillary distance, then at operation 1026, the largest pupillary distance is updated with the current pupillary distance, and at operation 1028, the next pair is selected and the process loops back to operation 1020.

When all remaining pairs have been processed, then at operation 1030, the ratio of focal length (in pixels) to the largest pupillary distance (also in pixels) is calculated and employed to determine if the user is too close to the screen, as previously described. Note that larger pupillary distances are associated with viewers closer to the screen.

Figure 11:
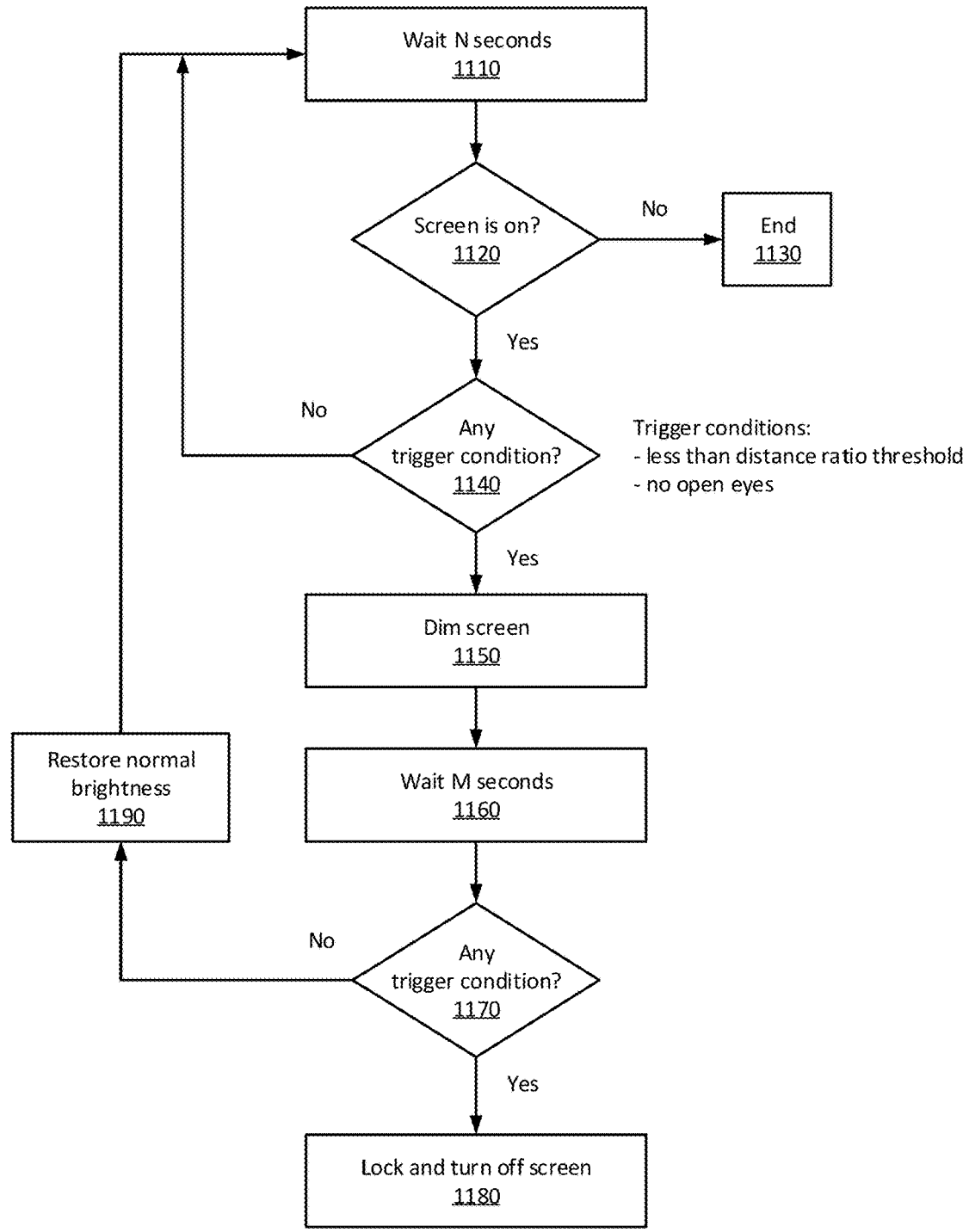
FIG. 11 is a flow diagram of a process for screen control in accordance with an example of the present disclosure.

FIG. 11 is a flow diagram of a process for screen control 150 in accordance with an example of the present disclosure. At operation 1110, the screen controller waits for N seconds (a selected delay period) before checking, at operation 1120, whether the screen is on or off. In some examples, N may be 15. If the screen is off, the process ends 1130. If the screen is on, then at operation 1140, a check for any trigger conditions is performed. Trigger conditions include (1) the user's eyes are less than a distance threshold from the screen, and (2) no open eyes are detected. If there are no trigger conditions, then the process loops back to operation 1110 and waits for another N seconds. In some examples, N may be 5. If any trigger conditions are detected, then at operation 1150, the screen is dimmed, and at operation 1160, the screen controller waits for M additional seconds. At operation 1170, another check is performed for any trigger conditions. If there are no trigger conditions, then at operation 1190, normal screen brightness is restored and the process loops back to operation 1110. However, if any trigger conditions do persist, then at operation 1180, the screen is locked and/or turned off.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for User Intent Extraction

Figure 12:
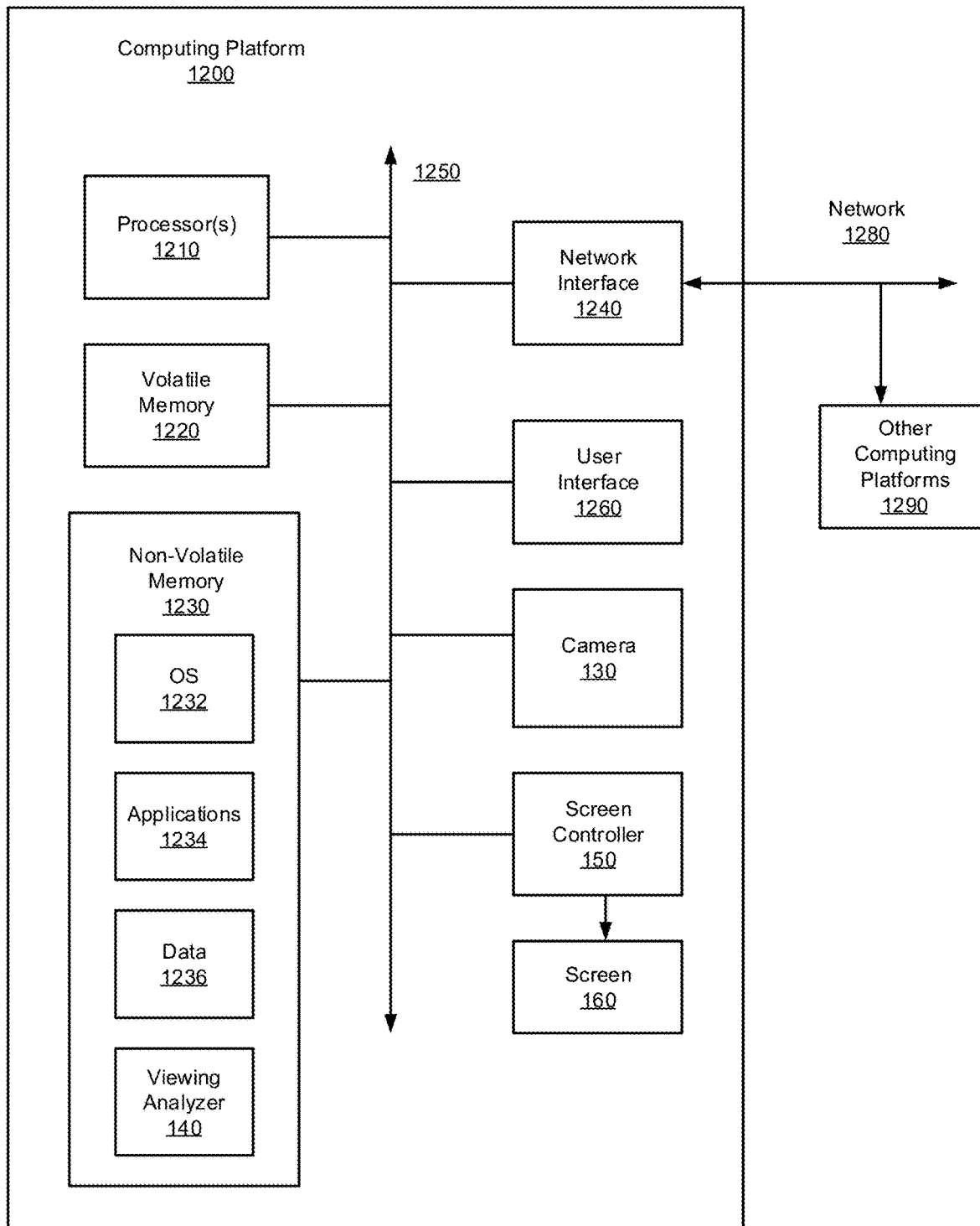
FIG. 12 is a block diagram of a computing platform configured to perform a process for screen brightness control and auto-locking based on eye detection in accordance with an example of the present disclosure.

FIG. 12 is a block diagram of a computing platform 1200 configured to perform a process for screen brightness control and auto-locking based on eye detection and relative distance estimation in accordance with an example of the present disclosure. In some cases, the platform 1200 may be a mobile device 110, as previously described in FIG. 1.

The computing platform or device 1200 includes one or more processors 1210, volatile memory 1220 (e.g., random access memory (RAM)), non-volatile memory 1230, user interface (UI) 1260, one or more network or communication interfaces 1240, a user interface 1260, a camera 130, a screen controller 150, a screen 160, and a communications bus 1250. The computing platform 1200 may also be referred to as a computer or a computer system.

The non-volatile (non-transitory) memory 1230 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The screen 160, controlled by screen controller 150, can provide a graphical user interface (GUI) and in some cases, may be a touchscreen or any other suitable display device.

The user interface 1260 can include one or more input/output (I/O) devices (e.g., a mouse, a keyboard, a microphone, one or more speakers, one or more biometric scanners, one or more environmental sensors, and one or more accelerometers, etc.).

The non-volatile memory 1230 stores an operating system 1232, one or more applications 1234, data 1236, and viewing analyzer 140, such that, for example, computer instructions of the operating system 1232, the applications 1234, and the viewing analyzer 140, are executed by processor(s) 1210 out of the volatile memory 1220. In some examples, the volatile memory 1220 can include one or more types of RAM and/or a cache memory that can offer a faster response time than a main memory. Data can be entered through the user interface 1260 or received from the other device such as camera 130. Various elements of the computer 1200 can communicate via the communications bus 1250.

The illustrated computing platform 1200 is shown merely as an example client device or server and can be implemented by any computing or processing environment with any type of machine or set of machines that can have suitable hardware and/or software capable of operating as described herein.

The processor(s) 1210 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 1210 can be analog, digital or mixed. In some examples, the processor 1210 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 1240 can include one or more interfaces to enable the computing platform 1200 to access a computer network 1280 such as a Local Area Network (LAN), a Wide Area Network (WAN), a Personal Area Network (PAN), or the Internet through a variety of wired and/or wireless connections, including cellular connections. In some examples, the network 1280 may allow for communication with other computing platforms 1290, to enable distributed computing.

In described examples, the computing platform 1200 can execute an application on behalf of a user of a client device. For example, the computing platform 1200 can execute one or more virtual machines managed by a hypervisor. Each virtual machine can provide an execution session within which applications execute on behalf of a user or a client device, such as a hosted desktop session. The computing platform 1200 can also execute a terminal services session to provide a hosted desktop environment. The computing platform 1200 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system comprising:
   a memory;
   a screen; and
   at least one processor coupled to the memory and configured to:
   detect one or more open eyes in an image received from a camera of the computer system;
   recognize properties of the detected open eyes, the properties including one or more of orientation, designation as a left eye or a right eye, and relative position of the eyes;
   group the detected open eyes into one or more pairs of eyes based on the recognized properties;
   measure pupillary distance in the image of each of the pairs of eyes;
   if the grouping results in two or more pairs of eyes, identify one of the pairs of eyes associated with a largest of the pupillary distances as a pair of eyes closest to the camera;
   calculate a relative distance from the camera to the pair of eyes closest to the camera, the relative distance calculated as a ratio of a focal length of the camera to the largest of the pupillary distances; and
   reduce brightness of the screen of the computer system if the relative distance is less than a threshold ratio.

2. The computer system of claim 1, wherein the at least one processor is further configured to determine a count of the detected open eyes and reduce brightness of the screen of the computer system if the count of the detected open eyes equals zero.

3. The computer system of claim 2, wherein the at least one processor is further configured to update, at periodic intervals, the relative distance from the camera to the pair of eyes closest to the camera and the count of detected open eyes.

4. The computer system of claim 3, wherein the at least one processor is further configured to lock the screen of the computer system after a selected time period has elapsed, if the updated relative distance from the camera to the pair of eyes closest to the camera remains less than the threshold ratio or if the updated count of detected open eyes remains at zero.

5. The computer system of claim 3, wherein the at least one processor is further configured to restore brightness of the screen of the computer system if the updated relative distance from the camera to the pair of eyes closest to the camera reaches the threshold ratio or if the updated count of detected open eyes exceeds zero.

6. The computer system of claim 2, wherein the at least one processor is further configured to lock the screen of the computer system if the count of the detected open eyes exceeds a threshold open eye count.

7. The computer system of claim 1, wherein the pupillary distance is represented in pixels of the image.

8. A method of controlling screen brightness based on eye detection comprising:

detecting, by a computer system, one or more open eyes in an image received from a camera of the computer system;
recognizing, by the computer system, properties of the detected open eyes, the properties including one or more of orientation, designation as a left eye or a right eye, and relative position of the eyes;
grouping, by the computer system, the detected open eyes into one or more pairs of eyes based on the recognized properties;
measuring, by the computer system, pupillary distance in the image of each of the pairs of eyes;
identifying, by the computer system, if the grouping results in two or more pairs of eyes, one of the pairs of eyes associated with a largest of the pupillary distances as a pair of eyes closest to the camera;
calculating, by the computer system, a relative distance from the camera to the pair of eyes closest to the camera, the relative distance calculated as a ratio of a focal length of the camera to the largest of the pupillary distances; and
reducing, by the computer system, brightness of a screen of the computer system if the relative distance is less than a threshold ratio.

9. The method of claim 8, further comprising determining a count of the detected open eyes and reduce brightness of the screen of the computer system if the count of the detected open eyes equals zero.

10. The method of claim 9, further comprising updating, at periodic intervals, the relative distance from the camera to the pair of eyes closest to the camera and the count of detected open eyes.

11. The method of claim 10, further comprising locking the screen of the computer system after a selected time period has elapsed, if the updated relative distance from the camera to the pair of eyes closest to the camera remains less than the threshold ratio or if the updated count of detected open eyes remains at zero.

12. The method of claim 10, further comprising restoring brightness of the screen of the computer system if the updated relative distance from the camera to the pair of eyes closest to the camera reaches the threshold ratio or if the updated count of detected open eyes exceeds zero.

13. The method of claim 9, further comprising locking the screen of the computer system if the count of the detected open eyes exceeds a threshold open eye count.

14. The method of claim 9, wherein the pupillary distance is represented in pixels of the image.

15. A non-transitory computer readable medium storing executable sequences of instructions to control screen brightness based on eye detection, the sequences of instructions comprising instructions to:
   detect one or more open eyes in an image received from a camera of a computer system;
   recognize properties of the detected open eyes, the properties including one or more of orientation, designation as a left eye or a right eye, and relative position of the eyes;
   group the detected open eyes into one or more pairs of eyes based on the recognized properties;
   measure pupillary distance in the image of each of the pairs of eyes, the pupillary distance represented in pixels of the image;
   if the grouping results in two or more pairs of eyes, identify one of the pairs of eyes associated with a largest of the pupillary distances as a pair of eyes closest to the camera;

calculate a relative distance from the camera to the pair of eyes closest to the camera, the relative distance calculated as a ratio of a focal length of the camera to the largest of the pupillary distances; and reduce brightness of a screen of the computer system if the relative distance is less than a threshold ratio.

16. The computer readable medium of claim 15, wherein the sequences of instructions further include instructions to determine a count of the detected open eyes and reduce brightness of the screen of the computer system if the count of the detected open eyes equals zero.

17. The computer readable medium of claim 16, wherein the sequences of instructions further include instructions to update, at periodic intervals, the relative distance from the camera to the pair of eyes closest to the camera and the count of detected open eyes.

18. The computer readable medium of claim 17, wherein the sequences of instructions further include instructions to lock the screen of the computer system after a selected time period has elapsed, if the updated relative distance from the camera to the pair of eyes closest to the camera remains less than the threshold ratio or if the updated count of detected open eyes remains at zero.

19. The computer readable medium of claim 17, wherein the sequences of instructions further include instructions to restore brightness of the screen of the computer system if the updated relative distance from the camera to the pair of eyes closest to the camera reaches the threshold ratio or if the updated count of detected open eyes exceeds zero.

20. The computer readable medium of claim 16, wherein the sequences of instructions further include instructions to lock the screen of the computer system if the count of the detected open eyes exceeds a threshold open eye count.

* * * * *